US009794816B2

(12) United States Patent
Himayat et al.

(10) Patent No.: US 9,794,816 B2
(45) Date of Patent: Oct. 17, 2017

(54) USER EQUIPMENT REALLOCATION BETWEEN NODES

(71) Applicant: INTEL IP CORPORATION, Santa Clara, CA (US)

(72) Inventors: Nageen Himayat, Fremont, CA (US); Alexander Sirotkin, Petach Tikva (IL); Shilpa Talwar, Los Altos, CA (US); Shu-Ping Yeh, New Taipei (TW); Mo-Han Fong, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 279 days.

(21) Appl. No.: 14/317,311

(22) Filed: Jun. 27, 2014

(65) Prior Publication Data

US 2015/0063295 A1 Mar. 5, 2015

Related U.S. Application Data

(60) Provisional application No. 61/872,591, filed on Aug. 30, 2013.

(51) Int. Cl.
*H04W 24/10* (2009.01)
*H04W 36/00* (2009.01)
(Continued)

(52) U.S. Cl.
CPC ........... *H04W 24/10* (2013.01); *H04W 16/18* (2013.01); *H04W 28/08* (2013.01); *H04W 28/24* (2013.01);
(Continued)

(58) Field of Classification Search
CPC ..... H04W 60/00; H04W 88/06; H04W 36/14; H04W 48/08; H04L 2001/0093
See application file for complete search history.

(56) References Cited

U.S. PATENT DOCUMENTS 8,199,719 B2 * 6/2012 Taneja ................. H04W 36/02 370/331
9,161,345 B2 * 10/2015 Lim ................. H04W 72/0406
(Continued)

FOREIGN PATENT DOCUMENTS

CN WO 2015027719 A1 * 3/2015 ............. H04B 7/024
WO 2012121757 A1 9/2012

OTHER PUBLICATIONS

3GPP TSG-RAN WG2 #82: R2-132222; RAN2 status on Small Cell Enhancements; May 20-24, 2013; Fukuoka, Japan.
(Continued)

*Primary Examiner* — Chandrahas Patel
(74) *Attorney, Agent, or Firm* — Thorpe North & Western

(57) ABSTRACT

A technology for a user equipment (UE) is disclosed that is operable in an anchor-booster architecture of a multiple radio access technology (multi-RAT) heterogeneous network (HetNet). Control information to an anchor cell can be transmitted from a wireless wide area network (WWAN) node in the multi-RAT UE. Data packets of the multi-RAT UE can be selected for transmission via one of the WWAN node and a wireless local area network (WLAN) node in the multi-RAT UE using a multi-RAT coordination function (MRCF) module. Each data packet from one of the WWAN node and the WLAN cell can be transmitted to a multi-RAT small cell evolved node B (SC-eNode B) based on the selection by the MRCF module.

25 Claims, 11 Drawing Sheets

(51) Int. Cl.
*H04W 16/18* (2009.01)
*H04W 28/24* (2009.01)
*H04W 28/08* (2009.01)
*H04W 88/06* (2009.01)

(52) U.S. Cl.
CPC ........ *H04W 36/0022* (2013.01); *H04W 88/06* (2013.01)

(56) References Cited

U.S. PATENT DOCUMENTS

| | | | |
|---|---|---|---|
| 9,215,256 B2* | 12/2015 | Suryavanshi | H04L 65/1073 |
| 9,282,487 B2* | 3/2016 | Sun | H04L 45/38 |
| 2012/0113839 A1* | 5/2012 | Etemad | H04B 7/024 |
| | | | 370/252 |

OTHER PUBLICATIONS

3GPP TR 37.834, V0.3.0; Study on WLAN/3GPP Radio Interworking (Release 12); May 2013; Valbonne—France.

\* cited by examiner

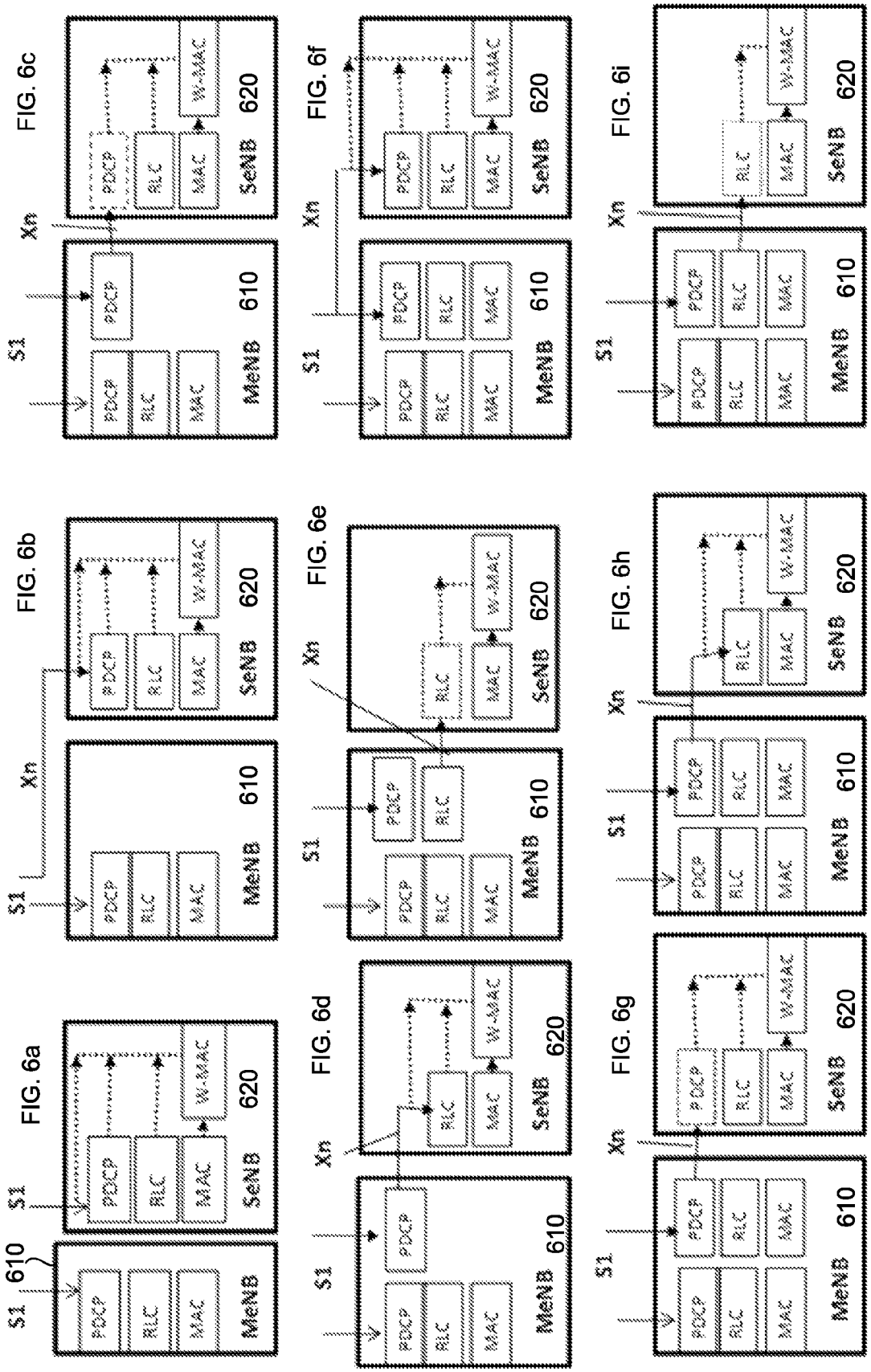

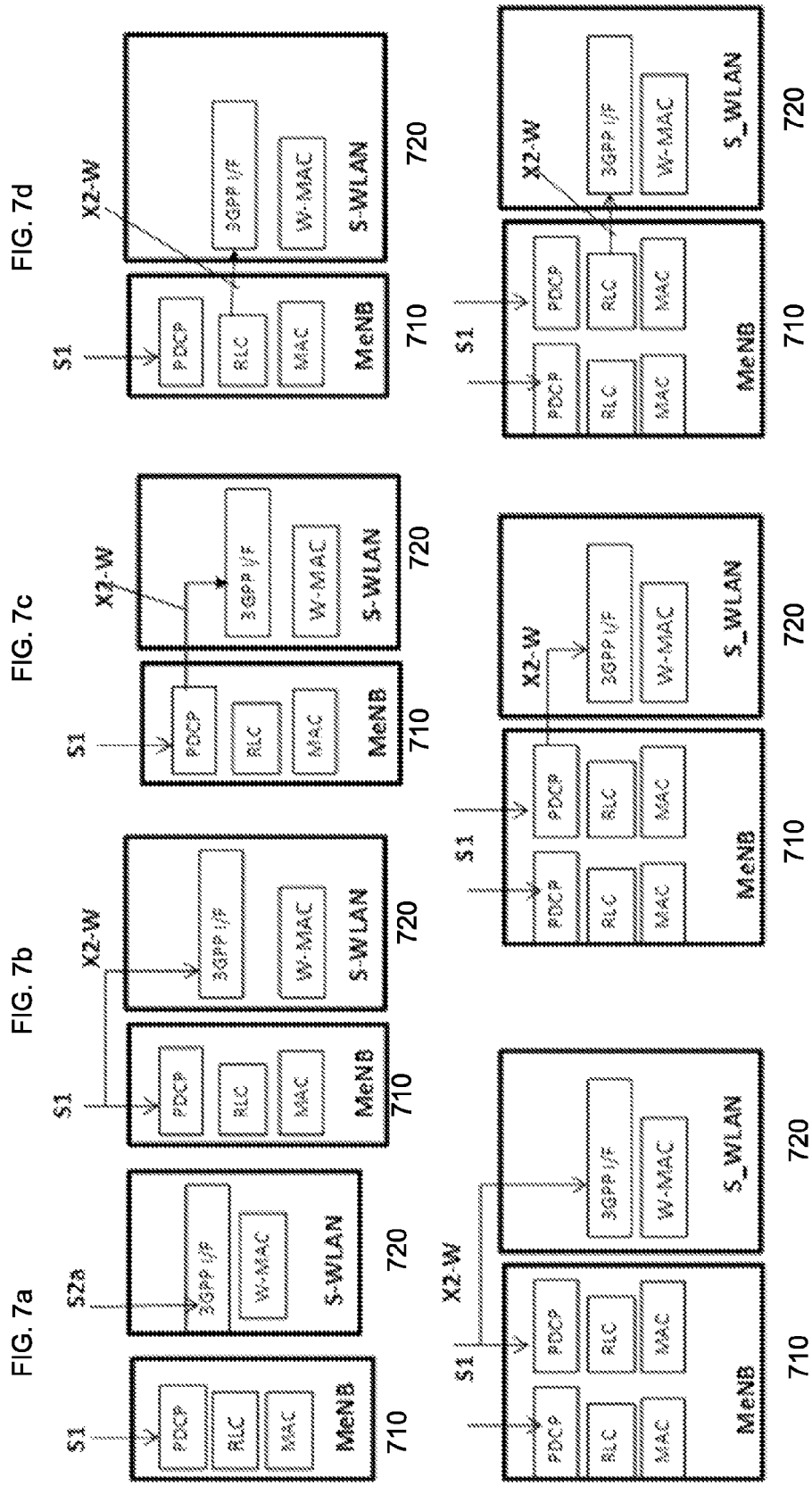

1000

Receiving, at a wireless local area network (WLAN) small cell access point (SC-AP), data packets from a user equipment (UE) selected by a multi-RAT coordination function (MRCF) module for transmission by a WLAN cell — 1010

Communicating control information from a wireless wide area network (WWAN) interface (I/F) integrated in the WLAN SC-AP to an anchor cell macro evolved node B (M-eNode B) — 1020

Transmitting the data packets from the WLAN SC-AP to the WWAN — 1030

FIG. 10

USER EQUIPMENT REALLOCATION BETWEEN NODES

RELATED APPLICATIONS

This application claims the benefit of and hereby incorporates by reference U.S. Provisional Patent Application Ser. No. 61/872,591, filed Aug. 30, 2013.

BACKGROUND

As the use of mobile devices, such as smart phones and tablet devices, becomes more ubiquitous, the demands on a limited amount of licensed radio frequency spectrum used by the mobile devices also increases. The increased demand on the licensed spectrum results in cellular network congestion and interference. In addition, an increased use of high bandwidth applications such as audio and video streaming can increase demands beyond the capability of the available licensed spectrum. This is especially true in high density and high use locations such as large cities and universities.

Improvements in wireless network architectures, hardware design, and processor speed have significantly increased the efficiency of wireless devices in their use of the available licensed spectrum. However, the ability to transmit a greater number of bits per second per hertz of available bandwidth may be reaching an upper limit.

As wireless communication technology advances, a growing number of mobile devices support simultaneously communication with multiple network terminals. For example, multiple communication systems are available in many areas, each of which can utilize one or more different interface technologies (such as wireless wide area networks (WWAN) and wireless local area networks (WLAN)). However, integration of the different interface technologies, such as multi-mode communications interfaces and multi-mode mobile devices, needs to be increased to meet the increasing demand from the mobile devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6a illustrates a data or user plane offload scenario for a collocated WLAN cell in a multi-RAT node in accordance with an example;

FIG. 6b illustrates another data or user plane offload scenario for a collocated WLAN cell in a multi-RAT node in accordance with an example;

FIG. 6c illustrates another data or user plane offload scenario for a collocated WLAN cell in a multi-RAT node in accordance with an example;

FIG. 6d illustrates another data or user plane offload scenario for a collocated WLAN cell in a multi-RAT node in accordance with an example;

FIG. 6e illustrates another data or user plane offload scenario for a collocated WLAN cell in a multi-RAT node in accordance with an example;

FIG. 6f illustrates another data or user plane offload scenario for a collocated WLAN cell in a multi-RAT node in accordance with an example;

FIG. 6g illustrates another data or user plane offload scenario for a collocated WLAN cell in a multi-RAT node in accordance with an example;

FIG. 6h illustrates another data or user plane offload scenario for a collocated WLAN cell in a multi-RAT node in accordance with an example;

FIG. 6i illustrates another data or user plane offload scenario for a collocated WLAN cell in a multi-RAT node in accordance with an example;

FIG. 7a illustrates a data plane or a user plane offload option for stand-alone WLAN SC-APs in accordance with an example;

FIG. 7b illustrates another data plane or a user plane offload option for stand-alone WLAN SC-APs in accordance with an example;

FIG. 7c illustrates another data plane or a user plane offload option for stand-alone WLAN SC-APs in accordance with an example;

FIG. 7d illustrates another data plane or a user plane offload option for stand-alone WLAN SC-APs in accordance with an example;

FIG. 7e illustrates another data plane or a user plane offload option for stand-alone WLAN SC-APs in accordance with an example;

FIG. 7f illustrates another data plane or a user plane offload option for stand-alone WLAN SC-APs in accordance with an example;

FIG. 7g illustrates another data plane or a user plane offload option for stand-alone WLAN SC-APs in accordance with an example;

FIG. 10 depicts a product including a non-transitory storage medium having stored thereon instructions that are adapted to be executed to implement a method for communicating information in an anchor-booster architecture of a multi-RAT HetNet in accordance with an example.

Figure 1:
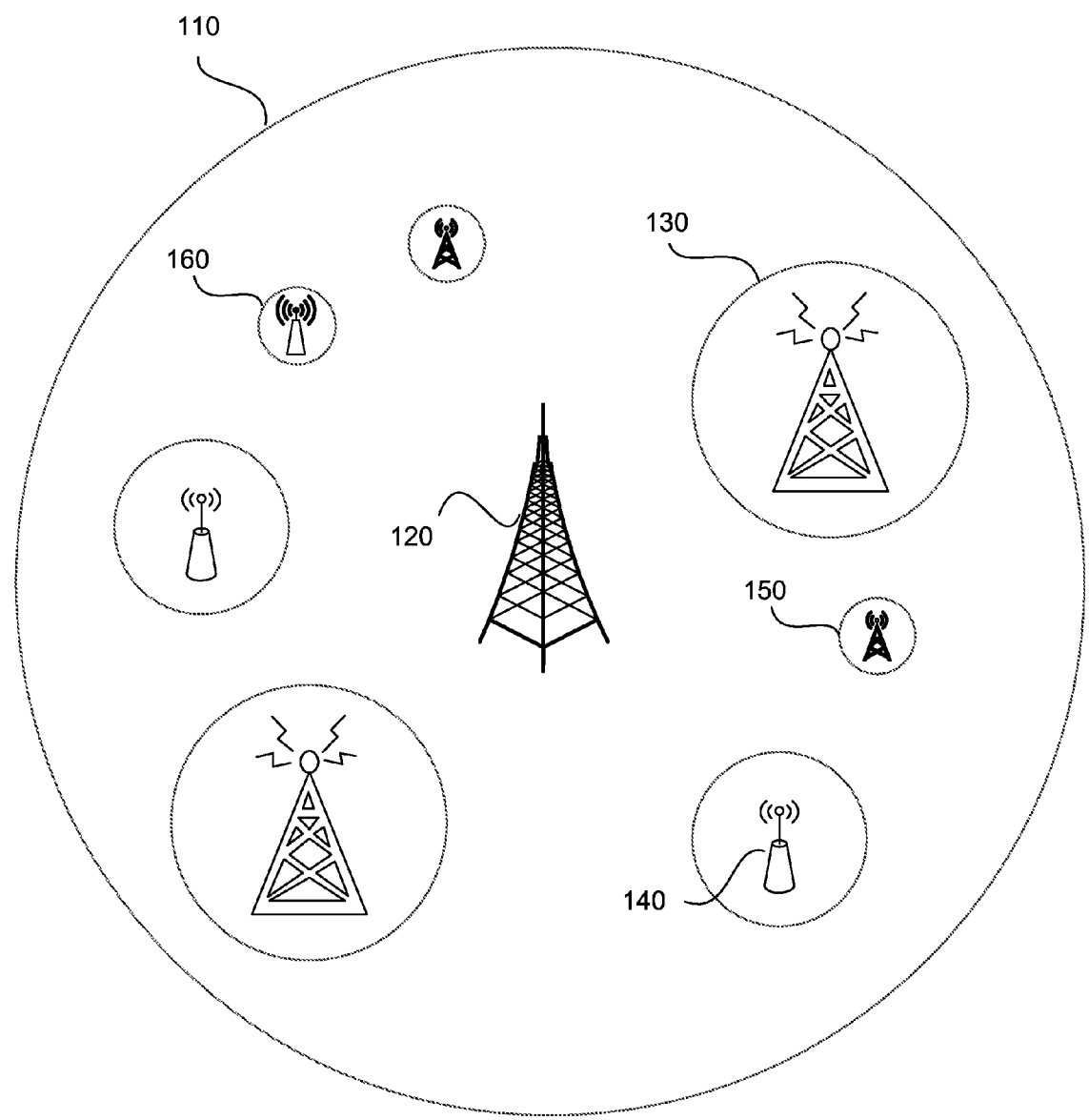
FIG. 1 depicts a multiple radio access technology (multi-RAT) heterogeneous networks (HetNet) with a macro-cell and a macro-node overlaided with layers of lower power nodes or small cell (SC) nodes in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In homogeneous networks, transmission stations, also called macro nodes, can provide basic wireless coverage to mobile devices. The geographical coverage area for each node can be referred to as a cell. The geographical coverage area of a macro node can be referred to as a macro cell. Heterogeneous networks (HetNets) were introduced to handle increased traffic loads on the macro nodes due to increased usage and functionality of mobile devices. HetNets can include a layer of planned high power macro nodes (or macro eNode Bs) overlaid with layers of lower power nodes or small cell nodes (micro-nodes, pico-nodes, femto-nodes, home-nodes, relay stations, etc.) that can be deployed in a less organized or uncoordinated manner within the coverage area of the macro nodes. The macro nodes can be used for basic coverage, and the low power nodes can be used to fill coverage holes, to improve capacity in hot-zones or at the boundaries between the macro nodes' coverage areas, and to improve indoor coverage where building structures impede signal transmission.

FIG. 1 depicts a multiple radio access technology (multi-RAT) heterogeneous networks (HetNet) with a macro-cell 110 and a macro-node 120 overlaided with layers of lower power nodes or small cell (SC) nodes including micro-nodes 130, pico-nodes 140, femto-nodes 150, and wireless local area network (WLAN) access points (APs) 160. In one embodiment, the multi-RAT HetNet can also include a multi-RAT node that can use one or more radio access technologies (RATs), such as wireless network technologies and/or cellular network technologies. In one embodiment, the WLAN APs can operate based on a standard such as the Institute of Electronics and Electrical Engineers (IEEE) 802.11-2012, IEEE 802.11ac, or IEEE 802.11ad standard. Other wireless standards for wireless networks configured to operate in unlicensed portions of the radio spectrum, such as Bluetooth, can also be used in a multi-RAT HetNet.

In one embodiment, various integration architectures can be used to integrate wireless local area networks (WLAN) with HetNet cellular networks. In one integration architecture, a control plane and a data plane can be partitioned between a cellular network, such as a wireless wide area network (WWAN), and a wireless network, such as a wireless local area network (WLAN). In one embodiment, the WWAN network can serve as a control and mobility anchor and the WLAN network can be used as a layer 2 data pipe to reduce the demand on cellular networks by providing additional capacity from unlicensed bands.

Figures 2A, 2B, 2C:
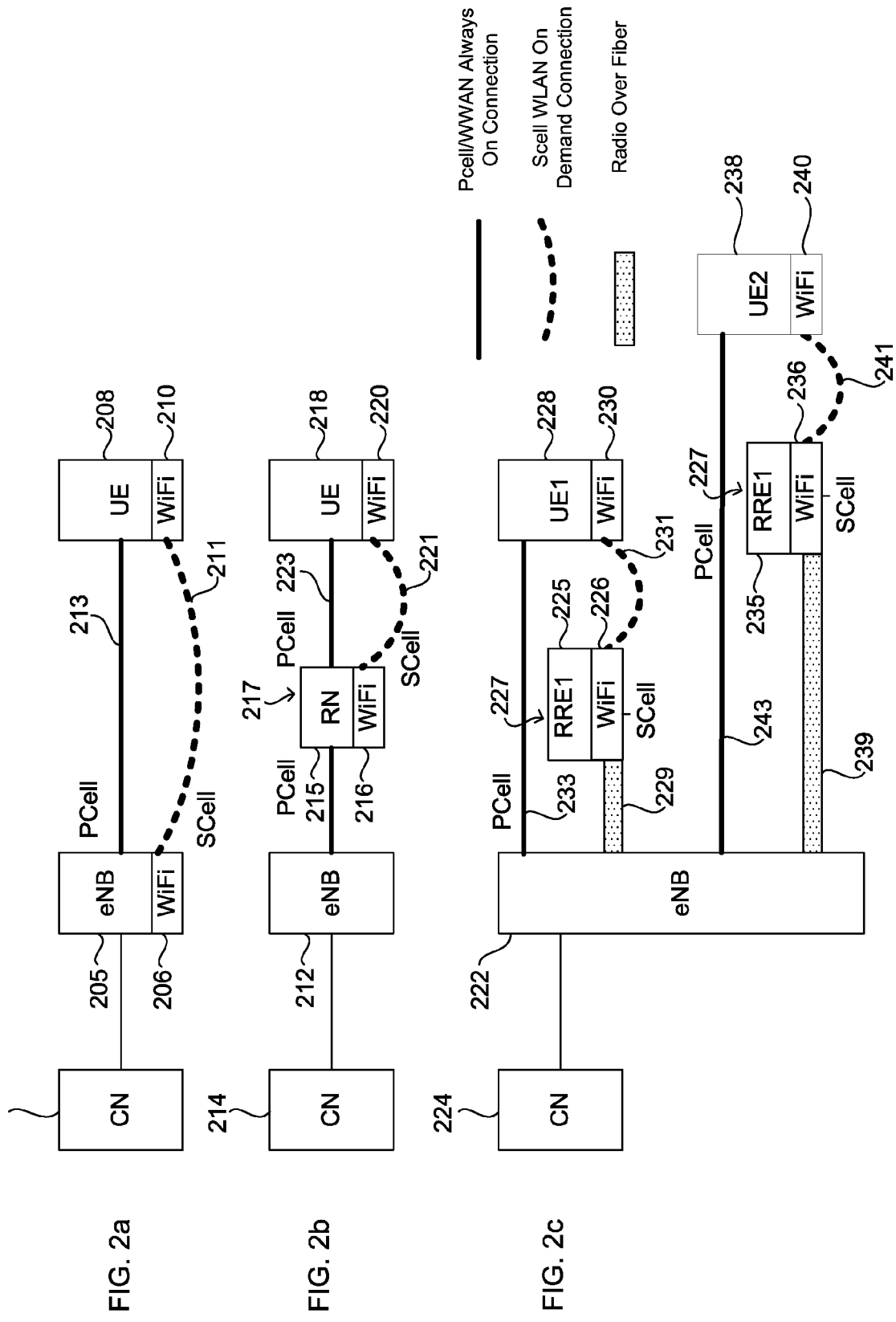
FIG. 2a illustrates a block diagram of a first architecture of a base station having an integrated primary cell (PCell) and secondary cell (SCell) in accordance with an example.
FIG. 2b illustrates a block diagram of a second architecture of a base station having an integrated PCell and SCell in accordance with an example.
FIG. 2c illustrates a block diagram of a third architecture of a base station having an integrated PCell and SCell in accordance with an example.

FIGS. 2a, 2b, and 2c illustrate different anchor-booster WWAN and WLAN integration architectures. FIG. 2a illustrates a third generation partnership project (3GPP) long term evolution (LTE) system with an evolved node B (eNode B) 205 connected to a core network 204 through a wired connection or a wireless connection. In one embodiment, the core network 204 can include a serving gateway and a packet data network (PDN) gateway. In one example, the eNode B 205 can be directly integrated with a WLAN cell, such as a wireless fidelity (Wi-Fi) cell 206. In another embodiment, the eNode B 205 carries a primary cell (PCell) that can be an always-on connection 213 with a user equipment (UE) 208. In another embodiment, the Wi-Fi cell 206 can carry a secondary cell (SCell) and maintain an on-demand connection 211 with a Wi-Fi cell 210 integrated with the UE 208. In one embodiment, for the eNode B 205 and the Wi-Fi cell 206 to communicate to form the on-demand SCell connection 211 the eNode B can be a small cell.

FIG. 2b illustrates another anchor-booster architecture. In one embodiment, an eNode B 212 can be connected to a core network 214 through a wired connection or a wireless connection. In another embodiment, the eNode B 212 can be connected to a plurality of integrated relay nodes 217. FIG. 2b further illustrates that each integrated relay node 217 can be comprised of a relay node 215 integrated with a Wi-Fi cell 216 or another type of WLAN cell. In another embodiment, each Wi-Fi access point 216 can be used to create one or more small cells to provide bandwidth in an unlicensed band.

In one embodiment, each relay node 215 can be configured to relay an uplink (UL) primary component carrier (PCC) and a downlink (DL) PCC between the eNode B 212 and a mobile wireless device, such as a UE 218. In another embodiment, the UE 218 can communicate with the Wi-Fi access point (AP) 216 via a SCell. In another embodiment, each relay node 215 in FIG. 2b carrying a UL PCC and a DL PCC via the PCell can maintain an always-on connection 223 with a UE 218 in a WWAN. In another embodiment, each relay node can also communicate with the eNode B 212. The Wi-Fi cell 216 can form an on-demand connection 221 with a Wi-Fi access point 220 integrated with the UE 218 to provide additional bandwidth in an unlicensed band. The on-demand connection can be managed via the PCell 217.

An additional anchor-booster architecture is illustrated in FIG. 2c. An eNode B 222 is connected to a core network 224 through a wired or wireless connection. In one embodiment, the eNode B can be connected to a plurality of integrated remote radio elements (RREs) 227. FIG. 2c further illustrates that the integrated RRE can include one or more RREs 225 and 235 that are integrated with Wi-Fi cell nodes 226 and 236, respectively. In one embodiment, the Wi-Fi cell nodes 226 and 236 can each form one or more SCells with the eNode B 222. In another embodiment, each RRE can only be a Wi-Fi cell. In another embodiment, each RRE 226 and 236 can be connected to the eNode B via a radio over fiber connection 229 and 239 or another type of broadband connection.

The eNode B 222 can form an always-on connection 233, 243 with each UE 228, 238 respectively via a PCell. An on-demand connection 231, 241 can be formed between Wi-Fi cells 226 and 236 via an SCell through the Wi-Fi cells 230, 240 that are integrated with the WWAN radios at a UE 228, 238 respectively to provide additional bandwidth in an unlicensed band to the UE. The integrated RRE 227 can include an eNode B in communication with multiple integrated RREs and Wi-Fi access points. A SCell can be selectively activated at the UE by the eNode B via one of the Wi-Fi cells based on the UE's location relative to the integrated RREs.

FIGS. 2a, 2b, and 2c provide several example architectures in which a WWAN cell, such as a 3GPP LTE cell or a WiMAX cell, can be integrated with a WLAN cell, such as a Wi-Fi cell or a Bluetooth cell, to provide tighter coordination between the use of licensed spectrum via a PCell operating in the WWAN and the use of unlicensed spectrum via an SCell operating in the WLAN. The integration can provide interfaces to better manage a WLAN offload experience without significant changes in other parts of an operator's network.

While FIGS. 2a, 2b, and 2c illustrate a single Wi-Fi access point (AP), each eNode B may be coupled with a plurality of Wi-Fi cells, or other types or radios configured to communicate in unlicensed bands. The plurality of unlicensed radios can be used to accommodate high levels of traffic from a plurality of UEs. In one embodiment, the WLAN access point 206 can include two or more different types of radios configured to communicate in an unlicensed spectrum. In one example, the WLAN access point may include a Wi-Fi cell and a Bluetooth radio. In one embodiment, the PCell connection 213 can be used to control offloading of data flows to the Wi-Fi cell and/or the Bluetooth radio.

In another anchor-booster architecture, a macro-assisted HetNet or phantom cell based architecture can be used to separate a control plane and a data plane. In one example, the phantom cell based architecture can separate the control plane and the data plane between different tiers of a hierarchical 3GPP HetNet. In one embodiment, the phantom cell based architecture can provide for a macro-cell tier to serve as a control and mobility anchor and a small cell tier can be used for data offload to boost data rates.

In another anchor-booster architecture a WWAN anchored WLAN architecture can be used for a WWAN dual connectivity anchor-booster architecture. In this anchor-booster architecture a WLAN can be integrated into a WWAN anchor-booster framework, such as integrating a multi-RAT small cell architecture into a WWAN anchor-booster framework. In one embodiment, the WWAN anchored WLAN architecture can be used across multiple tiers of a WWAN HetNet.

In one embodiment, WLAN based small cells can be integrated within a WWAN dual connectivity anchor-booster architecture. In one example, the WLAN cells of the WWAN anchored WLAN architecture can use WWAN cells as control and mobility anchor and split the control plane and data plane across the multiple tiers of the WWAN HetNet. In another embodiment, the WWAN cells can be separate from the WLAN cells. In another embodiment, the WLAN cells can be collocated or integrated with the WWAN cells.

Figures 3A, 3B, 3C:
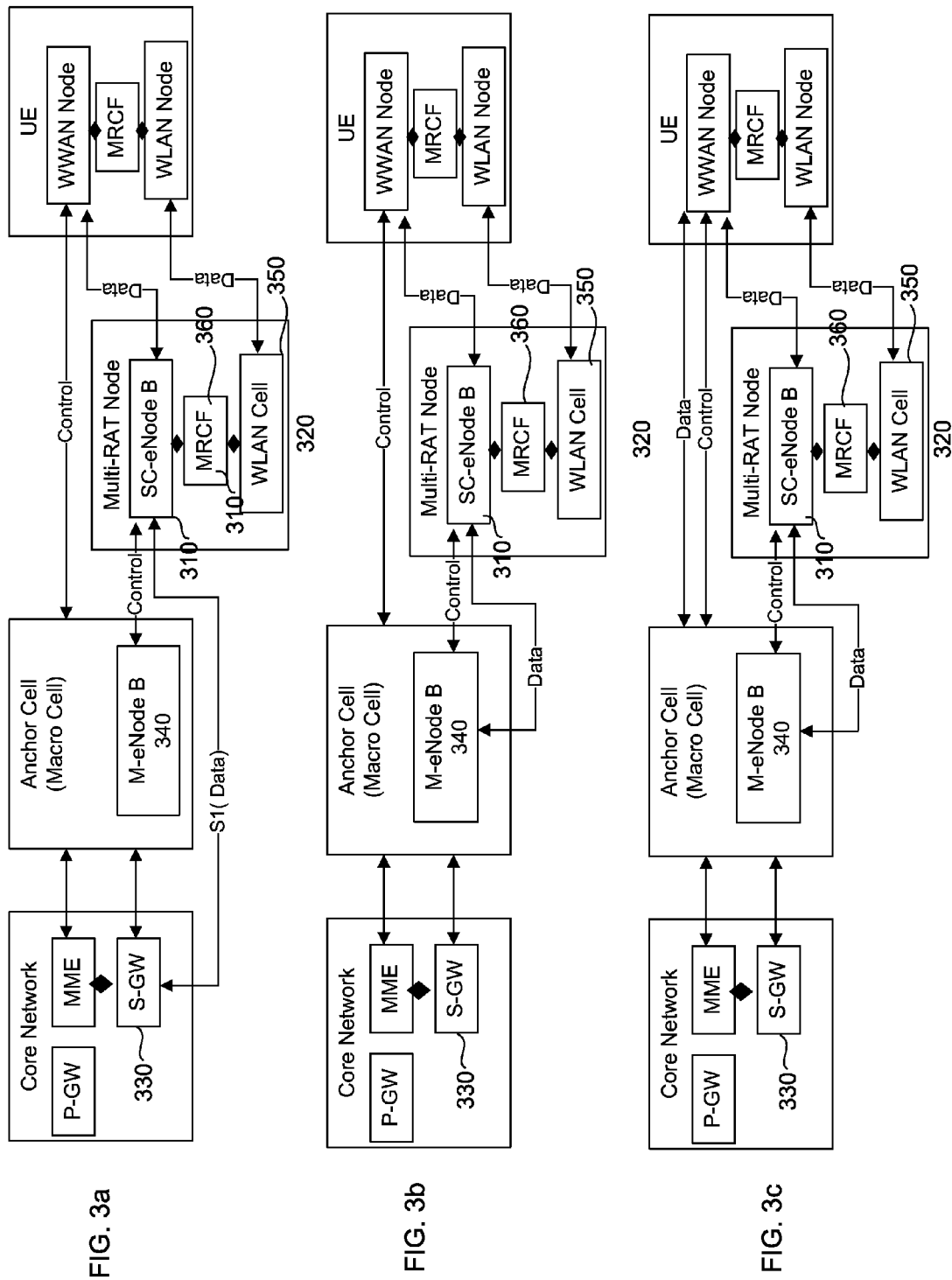
FIG. 3a depicts a wireless wide area network (WWAN) anchor-booster architecture with integrated wireless local area network (WLAN) cells in accordance with an example.
FIG. 3b depicts another WWAN anchor-booster architecture with integrated WLAN cells in accordance with an example.
FIG. 3c depicts another WWAN anchor-booster architecture with integrated WLAN cells in accordance with an example.

FIGS. 3a, 3b, and 3c show different WWAN anchor-booster architectures with integrated WLAN cells 350. In the WWAN anchor-booster architectures with integrated WLAN cells 350 illustrated in FIGS. 3a, 3b, and 3c, a macro-cell tier can serve as the control and mobility anchor where a small cell eNode B (SC-eNode B) 310 and a WLAN cell 350 of a small cell tier can be used as secondary cells for data offload.

FIG. 3a shows a SC-eNode B 310 of a multiple radio access technology (multi-RAT) node 320 that can directly connect with a serving gateway (S-GW) 330 to terminate an S1-U data plane. FIG. 3a further illustrates distinct data bearers and control bearers at a macro eNode B (M-eNode B) 340 and the SC-eNode B 310. In one embodiment, the WLAN bearers of the WLAN cell 350 can be anchored with the SC-eNode B 310.

FIG. 3b shows a SC-eNode B 310 of a multi-RAT node 320 can be connected indirectly with a S-GW 330 using a S1-U interface via an M-eNode B 340. In one embodiment, a S1-U interface to the S-GW 330 can be terminated at the M-eNode B 340. In one embodiment, the M-eNode B 340 can use an X2 interface to forward data packets from the M-eNode B 340 to the SC-eNode B 310. In another embodiment, the SC-eNode B 310 can be anchored at the M-eNode B 240 and data bearers and control bearers are not split. In another embodiment, the WLAN bearers of the WLAN cell 350 can be anchored with the SC-eNode B 320.

FIG. 3c shows a data bearer can be split between an M-eNode B 340 and an SC-eNode 310 of a multi-RAT node 320 when the data plane or user plane is anchored to the M-eNode B 340. In one embodiment, an S1-U interface to the S-GW 330 can be terminated at the M-eNode B 340. In another embodiment, data bearers and control bearers are split between the M-eNode B 340 and the SC-eNode B 310 or the multi-RAT node 320. In another embodiment, the WLAN bearers of the WLAN cell 350 can be anchored with the SC-eNode B 310.

FIGS. 3a, 3b, and 3c also each illustrate a WLAN cell 350 within the integrated multi-RAT node 320 anchored on the SC-eNode B 310. FIGS. 3a, 3b, and 3c each further illustrate a flow management between the SC-eNode B 310 and WLAN cell 350 can be managed locally at the multi-RAT node 320 using a multi-RAT coordination function (MRCF) 360.

In FIGS. 3a and 3b, a multi-RAT UE 370 can communicate control information to the M-eNode B 340. Data bearers can be used to communicate data between a WWAN node 380 at the UE 370 and the SC-eNode B and the multi-RAT node 320, and between a WLAN node 382 at the UE 370 and the WLAN cell 350 at the multi-RAT node 320. An MRCF function 384 at the UE 370 can be used to direct transmitted and received data between the WWAN node 380 and the WLAN node 382. In FIG. 3c, an additional data bearer can exist between the UE 370 and the M-eNB 340 at the anchor cell 390. The data bearer at the anchor cell 340 in FIG. 3c can be split, with data flowing either to the UE 370 or the multi-RAT node 320. This will be discussed in more detail in FIGS. 7e-7g.

Figure 4A:
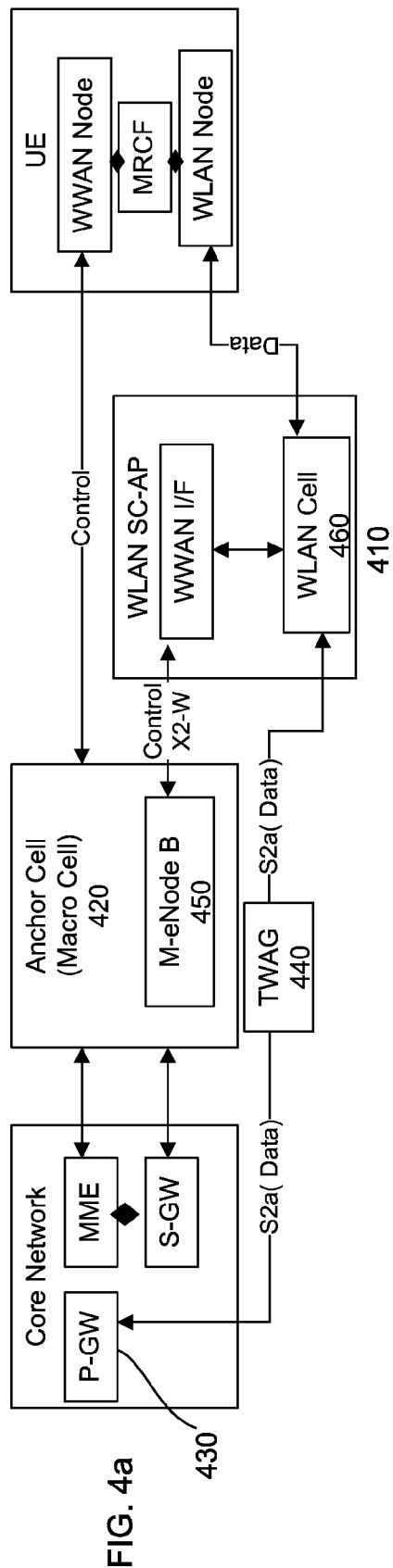
FIG. 4a illustrates a WWAN anchor-booster architecture with a stand-alone WLAN small cell access point (SC-AP) in accordance with an example.
Figure 4B:
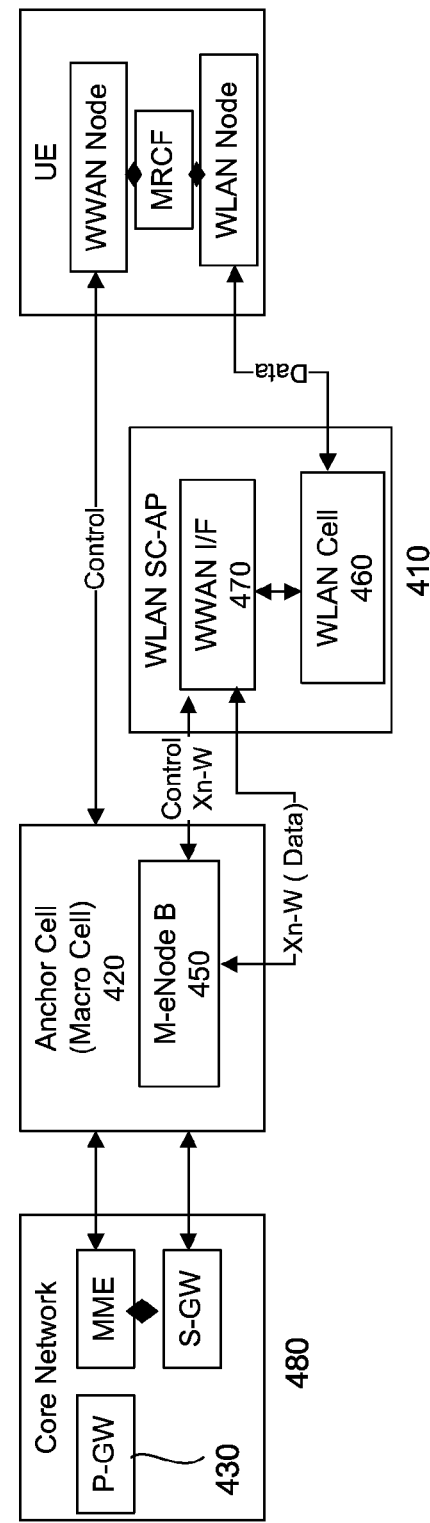
FIG. 4b illustrates another WWAN anchor-booster architecture with a stand-alone WLAN small cell access point (SC-AP) in accordance with an example in accordance with an example.

FIGS. 4a and 4b illustrate control plane architectures for WLAN small cell access point (SC-AP) 410 based WWAN anchor-booster architectures. A WLAN SC-AP is a WLAN cell 460 that is used in combination with a WWAN inter-working function (WWAN I/F) 470 to communicate data from an anchor cell 420 to a UE via the WLAN cell 460 in the WLAN SC-AP. FIGS. 4a and 4b further illustrate anchor-booster architectures with interfaces between an anchor cell and a WLAN SC-AP 410, i.e. a WLAN-only small cell based WWAN anchor-booster architectures.

FIG. 4a shows a WLAN SC-AP 410 can connect with a packet data network gateway (P-GW) 430 via a trusted wireless access gateway (TWAG) 440 to terminate an S2a data plane. FIG. 4a further illustrates distinct data bearers and control bearers at a macro eNode B (M-eNode B) 450 and the WLAN cell 460.

FIG. 4b shows a WWAN interface (I/F) 470 of a WLAN SC-AP 410 which can be connected indirectly with a packet data network gateway (P-GW) 430 of a core network 480 using an Xn-W interface via a M-eNode B 450 of an anchor cell 420. In one embodiment, an Xn-W interface is an interface that can be used to communicate control information and data packets between the M-eNode B 450 and the WWAN interface 470. In another embodiment, the WLAN SC-AP 410 can be anchored at the M-eNode B 450 and data bearers and control bearers are not split. In another embodiment, the WLAN bearer of the WLAN cell 460 can be anchored with the WWAN node 470.

In one embodiment, when an X2-W interface is used between an anchor cell 420 and the WLAN SC-AP 410, the WLAN SC-AP 410 can be integrated directly as a cell within the 3GPP anchor-booster architecture. As illustrated, an X2-W interface is an interface between the M-eNode B 450 and the WWAN I/F at the WLAN SC-AP that is used to carry control information. In one embodiment, the X2-W interface can be used to integrate the multi-RAT node with operators that operate the SC-eNode B and WLAN cell independently, as shown in FIGS. 3a, 3b, and 3c.

As shown in FIGS. 4a and 4b, a UE can communicate control information between a WWAN node at the UE and the M-eNode B 450 at the anchor cell 420. The UE can also communicate data between a WLAN node at the UE and a WLAN cell 460 at the WLAN SC-AP.

Figure 5A:
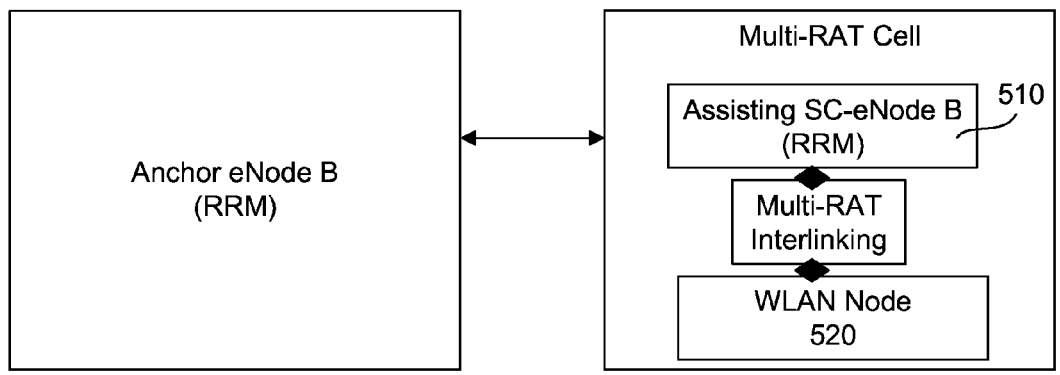
FIG. 5a illustrate a SC-eNode B using a local assisting radio resource control (RRC) function or a radio resource management (RRM) control function for offloading data to the WLAN cell in accordance with an example.

FIG. 5a illustrates an SC-eNode B 510 using a local assisting radio resource control (RRC) function or a radio resource management (RRM) control function to provide a low latency control of an offload of data to the WLAN cell 520, such as in the WWAN anchor-booster architectures with integrated WLAN small cells illustrated in the examples of FIGS. 3a, 3b, and 3c.

Figure 5B:
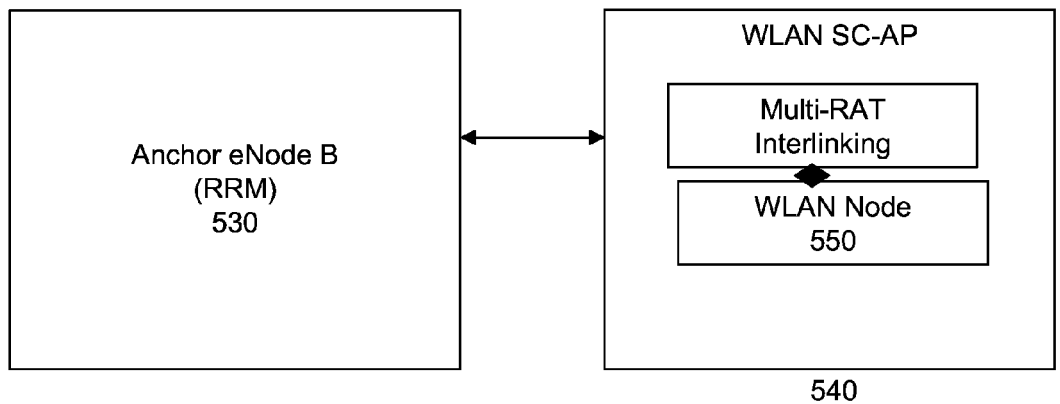
FIG. 5b illustrates a control functionality located in the anchor cell for a WLAN SC-AP based WWAN anchor-booster architecture in accordance with an example.

FIG. 5b illustrates a control functionality can be located in the anchor cell 530 for WLAN SC-AP 540 based WWAN anchor-booster architectures, as shown in FIGS. 4a and 4b. One advantage of using the RRC function or the RRM control function is to provide a tighter management of WLAN cell 550 data offload. In one embodiment, carrier aggregation signaling commands can be used for WLAN specific parameters. In one example, an M-eNode B of an anchor cell 530 can use a packet data convergence protocol (PDCP) function or a radio link control (RLC) function.

FIGS. 6a-6i illustrate different data or user plane offload scenarios for a collocated WLAN cell in a multi-RAT node (as shown in FIGS. 3a, 3b, and 3c). FIGS. 6a-6i further illustrate splitting data planes between the M-eNode B 610 and the multi-RAT node 620.

FIG. 6a illustrates a data bearer processing at an SC-eNode B 620 independent of the data bearer processing at an M-eNode B 610. In one embodiment, the M-eNode B 610 and the SC-eNode B 620 can each receive bearer traffic via an S1 interface with an S-GW. In one embodiment, data plane traffic received via the S1 connection at the SC-eNode B 620 can be routed to a WLAN media access control (MAC) layer of the SC-eNode B 620 via a layer of the LTE stack that is above a PDCP layer, below the PDCP layer, below an RLC layer, or below a media access control (MAC) layer of the SC-eNode B 620.

In another embodiment, when a WLAN security mechanism is reused, data plane traffic may be offloaded to the WLAN cell (e.g. the W-MAC) at a layer that is above the PDCP layer without going through a WWAN ciphering process. In another embodiment, PDCP layer buffering and in-sequence delivery can be used when traffic flows are dynamically switched between WLAN cells and WWAN cells. In another embodiment, traffic flows can be dynamically switched between the WLAN cells and the WWAN cells below the RLC layer. In one example, when traffic flows are switched below the RLC layer, RLC reordering buffer and/or MAC layer aggregation may be used to accommodate WLAN latency.

When data is split between the anchor cell containing M-eNode B 610 and the SC-eNode B 620, to split the data between the SC-eNode B and the WLAN cell, implementation complexities can be balanced with performance. In another embodiment, the M-eNode B 610 can use a single RLC entity to provide in-sequence delivery of data. In another embodiment, when the M-eNode B 610 uses the single RLC entity WLAN, latency can be accounted for. In another embodiment, the SC-eNode B 620 can be configured to receive bearer traffic via an S1 interface directly from a serving gateway (S-GW) of a core network, as shown in FIG. 6a. In another embodiment, a WLAN media access control (W-MAC) layer in the SC-eNode B 620 can be configured to receive the bearer traffic from: an Open Systems Interconnect (OSI) layer located above a packet data convergence protocol (PDCP) layer of the SC-eNode B 620; a PDCP layer of the SC-eNode B 620; a radio link control (RLC) layer of the SC-eNode B 620; or a MAC layer of the SC-eNode B 620.

FIGS. 6b-6e illustrate bearer traffic routed to the SC-eNode B 620 from the M-eNode B over an X2 interface. In one embodiment, traffic from the M-eNode B 610 can be routed to a W-MAC layer of the SC-eNode B 620 via an OSI layer located above a PDCP layer, at a PDCP layer, at an RLC layer, or at a MAC layer of the SC-eNode B 620. In one embodiment, the SC-eNode B can use a full PDCP stack, a slave PDCP stack, or an RLC stack. FIG. 6b illustrates an S1 interface terminating at an M-eNode B and no bearer split in the M-eNode B. FIG. 6b further illustrates a master-slave PDCP. FIG. 6c illustrates an S1 interface terminating an M-eNode B and no bearer split in the M-eNode B. FIG. 6b further illustrates that an independent RLC at the SC-eNode B. FIG. 6d illustrates an S1 interface terminating at an M-eNode B and no bearer split in the M-eNode B. FIG. 6d further illustrates a master-slave RLC.

In one embodiment, the SC-eNode B 620 illustrated in FIGS. 6b-6e can be configured to receive bearer traffic via an Xn interface directly from the M-eNode B 610. In another embodiment, the SC-eNode B 620 can be configured to receive bearer traffic via an S1 interface directly from a serving gateway (S-GW) of a core network. In another embodiment, a WLAN media access control (W-MAC) layer in the SC-eNode B 620 can be configured to receive the bearer traffic from: an Open Systems Interconnect (OSI) layer located above a packet data convergence protocol (PDCP) layer of the SC-eNode B 620; a PDCP layer of the SC-eNode B 620; a radio link control (RLC) layer of the SC-eNode B 620; or a MAC layer of the SC-eNode B 620.

In another embodiment, offloading options between an SC-eNode B and a WLAN interface may be restricted based on one or more functions implemented in the M-eNode B. In one example, FIG. 6b illustrates that when the M-eNode B 610 performs the RLC processing for in-order delivery of data, only RLC layer data offload or MAC layer data offload may be implemented for the WLAN interface.

FIGS. 6f-6i illustrate bearer traffic routed to the SC-eNode B 620 directly over an Xn interface or from the M-eNode B 610 over an Xn interface. In one embodiment, traffic from the M-eNode B 610 can be routed to a wireless MAC (W-MAC) layer of the SC-eNode B 620 above a PDCP layer, at a PDCP layer, at a RLC layer, or at a MAC layer of the SC-eNode B 620. FIG. 6f illustrates an S1 interface terminating an M-eNode B 610 and a bearer split in the M-eNode B 610. FIG. 6f further illustrates independent PDCP split bearers. FIG. 6g illustrates an S1 interface terminating an M-eNode B 610 and a bearer split in the M-eNode B 610. FIG. 6g further illustrates master-slave PDCP split bearers. FIG. 6h illustrates an S1 interface terminating an M-eNode B 610 and a bearer split in the M-eNode B 610. FIG. 6h further illustrates independent RLC split bearers. FIG. 6i illustrates an S1 interface terminating an M-eNode B 610 and a bearer split in the M-eNode B 610. FIG. 6i further illustrates master-slave RLC split bearers.

In one embodiment, data packets communicated between the M-eNode B 610 and a UE can be communicated on a bearer, wherein the bearer can be split at the M-eNode B 610 at one of: an Open Systems Interconnect (OSI) layer located above a packet data convergence protocol (PDCP) layer of the M-eNode B 610; a PDCP layer of the M-eNode B 610; or a radio link control (RLC) layer of the M-eNode B 610. In another embodiment, data packets communicated between the SC-eNode B 610 and a UE can be communicated on a bearer, wherein the bearer can be split at the SC-eNode B 620 between a WWAN node and a WLAN node at one of: an Open Systems Interconnect (OSI) layer located above a packet data convergence protocol (PDCP) layer of the SC-eNode B 620; a PDCP layer of the SC-eNode B 620; or a radio link control (RLC) layer of the SC-eNode B 620.

FIGS. 7a-7g illustrate data plane or user plane offload options for a stand-alone S-WLAN 720, as illustrated in FIGS. 4a and 4b. FIG. 7a illustrates bearer traffic routed to the M-eNode B 720 directly over an S1 interface and bearer traffic routed to the S-WLAN 720 directly over an S2a interface. In one embodiment, the S-WLAN 720 can receive bearer traffic via an S2a interface directly from a packet data network gateway (P-GW) of a core network. In another embodiment, a WLAN media access control (W-MAC) layer in the S-WLAN 720 can be configured to receive the bearer traffic via a WWAN I/F and from: an Open Systems Interconnect (OSI) layer located above a packet data convergence protocol (PDCP) layer of the M-eNode B; a PDCP layer of the M-eNode B; or a radio link control (RLC) layer of the M-eNode B.

FIG. 7b illustrates bearer traffic routed from the M-eNode B 710 to a 3GPP interface (I/F) of the S-WLAN 720 above a PDCP layer. FIG. 7c illustrates bearer traffic routed from the M-eNode B 710 to a 3GPP interface (I/F) of the S-WLAN 720 at a PDCP layer over an X2-W interface. FIG. 7d illustrates bearer traffic routed from the M-eNode B 710 to a 3GPP interface (I/F) of the S-WLAN 720 at PDCP layer over an X2-W interface. FIG. 7e illustrates bearer traffic routed to the M-eNode B 710 over an S1 interface. FIG. 7e further illustrates bearer traffic routed from a 3GPP interface (I/F) of the S-WLAN 720 B 710 at PDCP layer over an X2-W interface from the M-eNode. FIG. 7f illustrates bearer traffic routed to the M-eNode B 710 over an S1 interface. FIG. 7f further illustrates bearer traffic routed from the M-eNode B 710 to a 3GPP interface (I/F) of the S-WLAN 720 at a PDCP layer over an X2-W interface. FIG. 7g illustrates bearer traffic routed to the M-eNode B 710 over an S1 interface. FIG. 7g illustrates bearer traffic routed from the M-eNode B 710 to a 3GPP interface (I/F) of the S-WLAN 720 at a RLC layer over an X2-W interface. In one embodiment, the X2-W interface or the X2-W interface can be an enhanced X2 interface to communicate WLAN information.

In one embodiment, an X2-W interface can be used for data plane or user plane offload options for S-WLAN 720 in the anchor-booster architecture. In another embodiment, an X2-W interface can be used for data plane or user plane offload options for data plane offload functions for data plane splits between the WLAN cell of the S-WLAN 720 and the M-eNode B 710. In another embodiment, for selected data split options, selected functions must be supported by the WWAN interface within the S-WLAN 720. In one example, when the M-eNode B 710 does not process the data plane then the WWAN interface can support a packet discarding function, a header compression function, a data forwarding function, a buffering function, an in-sequence delivery function, and so forth.

In one embodiment, when the multi-RAT node, the WLAN SC-AP, the WWAN node of the multi-RAT node, or the WLAN cell of the multi-RAT node (as shown in FIGS. 6a-6i and 7a-7g) operate in a stand-alone mode, then a limited depth data-plane integration can be assumed. In one example, the SC-eNode B or the M-eNode B can operate with a full LTE/WLAN stack for the scenarios shown in FIGS. 6c and 6d. In another embodiment, when bearer split or flow aggregation is supported in an anchor-booster architecture, then offloading below the RLC layer can be used to provide for reordering and in-sequence data packet or control packet delivery. In another embodiment, traffic offloaded to the WLAN interface can be tunneled through a WLAN link, such as through MAC layer tunnels. In another embodiment, when the WLAN AP assigns Internet protocol (IP) addresses to the WLAN link, then IP layer tunneling can be used.

In one embodiment, the S-WLAN 720 can receive bearer traffic via an X2-W interface directly from the M-eNode B 710. In another embodiment, a WLAN media access control (W-MAC) layer in the S-WLAN 720 can be configured to receive the bearer traffic via a WWAN I/F or a 3GPP I/F and from: an Open Systems Interconnect (OSI) layer located above a packet data convergence protocol (PDCP) layer of the 5-WLAN 720; a PDCP layer of the S-WLAN 720; or a radio link control (RLC) layer of the S-WLAN 720.

In one embodiment, dynamic radio link assignments for the multi-RAT node or WLAN SC-AP can be used for data offloading. In another embodiment, a cell or RAT carrying data bearers can be changed dynamically using signaling over an X2 interface or using RRC signaling for integrated multi-RAT cells. In another embodiment, signaling procedures used to set up data bearer assignments can use modified carrier aggregation type commands such as a SC add (S-cell-Add) command or a SC remove (S-cell-Remove) command. In one example, when the multi-RAT node or WLAN SC-AP directly terminates a S1-U interface or a link to an S2a interface, 3GPP mobility management signaling can be initiated to move flows between cells and/or RATs. In this example, simultaneous use of multiple links can require that radio resources are allocated and maintained across multiple links. Alternatively, for cases where multi-link aggregation is not required, fast session transfers with establishment and tear down of multiple S-cells can be used.

In one example, a UE can be in an idle mode when there is no traffic generated over any data bearers. In this example, no radio resources are allocated in an evolved universal terrestrial radio access network (E-UTRAN) and the UE can perform cell selection and/or cell reselection from macro cell anchor nodes. In another example, radio resources per cell or RAT can be torn down or in dormant state when no traffic is generated over the data bearers assigned to a selected cell or RAT. In this example, the M-eNode B can manage the dormancy states.

In one embodiment, selected WLAN parameters, selected measurements, and selected link related information can be transferred directly to the SC-eNode B via a multi-RAT coordination function (MRCF) or can be transferred to the M-eNode B over the X2-W interface via the X2-W interface. In another embodiment, the selected WLAN parameters, selected measurements, and selected link related information can include: WLAN scheduler state measurements; current throughput information; a quality of service (QoS) estimate and/or a quality of experience (QoE) estimate from the user (such as power consumed, delay, buffer status, mean opinion score, user preferences etc.) on the feedback link; WLAN congestion information; WLAN load utilization; physical carrier sense reports from the UE; and so forth. In another embodiment, information for data packet segmentation can be reported for the RLC layer, such as a packet size derived from modulation and coding scheme (MCS) rates and transmit opportunities (TX-Ops). In another embodiment, when joint RRM and MAC layer scheduling is used then fast feedback on channel quality and/or channel delay can be reported.

In one embodiment, simultaneous multi-RAT operation can be performed over a WLAN link and a WWAN link. In another embodiment, simultaneous transmission can be performed over the WWAN link using time-division multiplexing. In another embodiment, the WLAN cell can be selected from a millimeter wave cell, a wireless gigabit (WiGig) cell, or a device to device (D2D) cell of the multi-RAT node.

Figure 8:
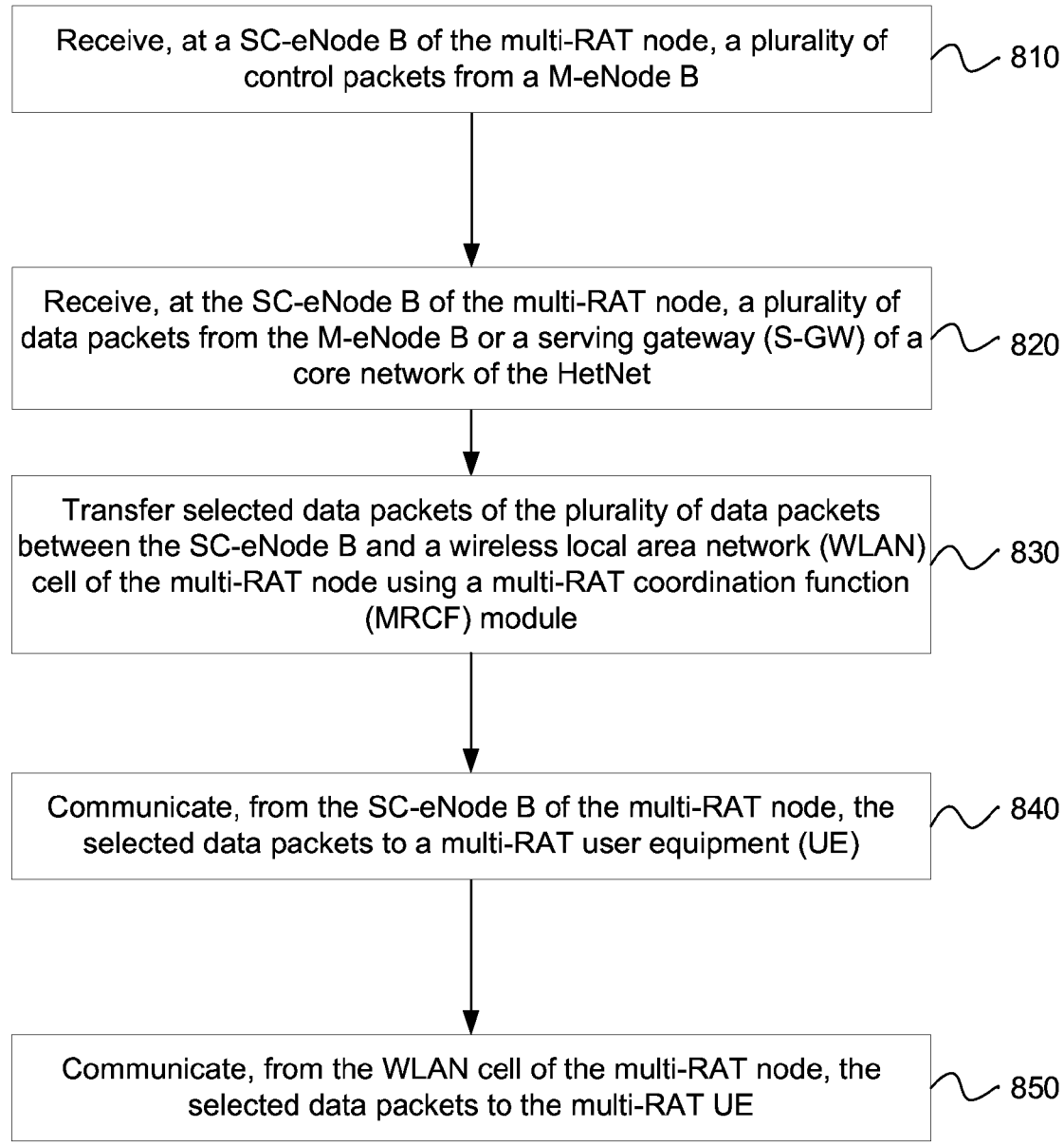
FIG. 8 depicts the functionality of computer circuitry of a multi-RAT node operable in an anchor-booster architecture of a multi-RAT HetNet in accordance with an example.

FIG. 8 uses a flow chart 800 to illustrate the functionality of one embodiment of the computer circuitry with a multi-RAT node operable in an anchor-booster architecture of a multi-RAT HetNet. The functionality may be implemented as a method or the functionality may be executed as instructions on a machine, where the instructions are included on at least one computer readable medium or one non-transitory machine readable storage medium. The multi-RAT node can be configured to receive, at a small cell evolved node B (SC-eNode B) of the multi-RAT node, a plurality of control packets from a macro eNode B (M-eNode B), as in block 810. The multi-RAT node can be further configured to receive, at the SC-eNode B of the multi-RAT node, a plurality of data packets from the M-eNode B or a serving gateway (S-GW) of a core network of the HetNet, as in block 820. The multi-RAT node can be further configured to transfer selected data packets of the plurality of data packets between the SC-eNode B and a wireless local area network (WLAN) cell of the multi-RAT node using a multi-RAT coordination function (MRCF) module, as in block 830. The multi-RAT node can be further configured to communicate, from the SC-eNode B of the multi-RAT node, the selected data packets to a multi-RAT user equipment (UE), as in block 840. The multi-RAT node can be further configured to communicate, from the WLAN cell of the multi-RAT node, the selected data packets to the multi-RAT UE, as in block 850.

In one embodiment, the multi-RAT node can be further configured to transmit, from the SC-eNode B of the multi-RAT node, a plurality of control packets to the M-eNode B. In another embodiment, the multi-RAT node can be further configured to receive, at the SC-eNode B of the multi-RAT node, data packets from WWAN node in the multi-RAT UE selected by a MRCF module of the multi-RAT UE and receive, at the WLAN cell of the multi-RAT node, data packets from WLAN cell in the multi-RAT UE selected by a MRCF module of the multi-RAT UE. In another embodiment, the multi-RAT node can be further configured to transmit, from the SC-eNode B of the multi-RAT node, the data packets received at the WWAN node and the WLAN cell, to the M-eNode B or the S-GW of a core network of the HetNet. In another embodiment, the multi-RAT node can be further configured to receive the plurality of control packets from the M-eNode B using an X2 interface. In another embodiment, the multi-RAT node can be further configured to transfer selected data packets of the plurality of data packets to the WLAN cell of the multi-RAT node on a layer above a packet data convergence protocol (PDCP) layer.

In one embodiment, the multi-RAT node can be further configured to dynamically transfer the selected data packets of the plurality of data packets between the SC-eNode B and the WLAN cell of the multi-RAT node and transfer the selected data packets of the plurality of data packets from the SC-eNode B to the WLAN cell of the multi-RAT node using a layer that is located below a PDCP layer, a radio link control (RLC) layer, or a medium access control (MAC) layer. In another embodiment, the selected data packets are transferred from the SC-eNode B using a layer located below the PDCP layer, below the RLC layer, or below the MAC layer when the multi-RAT node uses data packet flow aggregation. In another embodiment, the multi-RAT node can be further configured to transfer the selected data packets of the plurality of data packets from the SC-eNode B to the WLAN cell of the multi-RAT node using a MAC layer tunnel through a WLAN link.

In one embodiment, the multi-RAT node can be further configured to receive the plurality of data packets at the multi-RAT node from the M-eNode B or the S-GW using a full packet data convergence protocol (PDCP) stack, a slave PDCP stack, or a radio link control (RLC) stack. In another embodiment, the multi-RAT node can be further configured to enter a dormant state when no data packets are received from the M-eNode B or the S-GW of the core network within a selected period of time. In another embodiment, the multi-RAT node can be further configured to transfer selected data packets of the plurality of data packets between the SC-eNode B and the WLAN cell using the MRCF module, wherein the WLAN cell can be selected from a millimeter wave cell, a wireless gigabit (WiGig) cell, or a device to device (D2D) cell of the multi-RAT node.

In one embodiment, the SC-eNode B can be further configured to control and coordinate communication of data packets using the MRCF module. In another embodiment, the multi-RAT node can be configured to receive bearer traffic via an S1 interface directly from a serving gateway (S-GW) of a core network. In another embodiment, a WLAN media access control (W-MAC) layer in the multi-RAT node can be configured to receive the bearer traffic from: an Open Systems Interconnect (OSI) layer located above a packet data convergence protocol (PDCP) layer of the SC-eNode B; a PDCP layer of the SC-eNode B; a radio link control (RLC) layer of the SC-eNode B; or a MAC layer of the SC-eNode B. In one embodiment, the multi-RAT node can be configured to receive bearer traffic via an Xn interface directly from the M-eNode B. In a WLAN media access control (W-MAC) layer in the multi-RAT node can be configured to receive the bearer traffic from: an Open Systems Interconnect (OSI) layer located above a packet data convergence protocol (PDCP) layer of the SC-eNode B; a PDCP layer of the SC-eNode B; a radio link control (RLC) layer of the SC-eNode B; or a MAC layer of the SC-eNode B.

Figure 9:
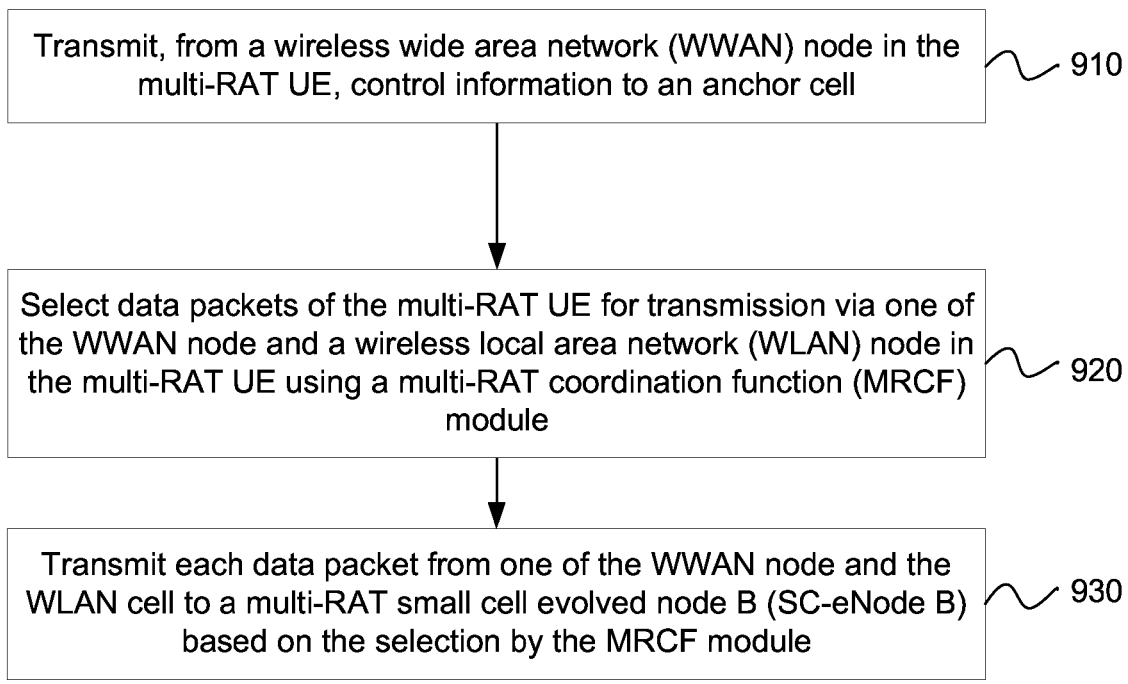
FIG. 9 depicts the functionality of computer circuitry of a UE operable in an anchor-booster architecture of a multi-RAT HetNet in accordance with an example.

FIG. 9 uses a flow chart 900 to illustrate the functionality of one embodiment of the computer circuitry with a UE operable in an anchor-booster architecture of a multi-RAT HetNet. The functionality may be implemented as a method or the functionality may be executed as instructions on a machine, where the instructions are included on at least one computer readable medium or one non-transitory machine readable storage medium. The UE can be configured to transmit, from a wireless wide area network (WWAN) node in the multi-RAT UE, control information to an anchor cell, as in block 910. The UE can be further configured to select data packets of the multi-RAT UE for transmission via one of the WWAN node and a wireless local area network (WLAN) node in the multi-RAT UE using a multi-RAT coordination function (MRCF) module, as in block 920. The UE can be further configured to transmit each data packet from one of the WWAN node and the WLAN cell to a multi-RAT small cell evolved node B (SC-eNode B) based on the selection by the MRCF module, as in block 930.

In one embodiment, the UE can be further configured to transmit selected data packets from the WWAN node to the anchor cell. In another embodiment, the UE can be further configured to receive selected data packets at the WWAN node from a M-eNode B at the anchor cell. In another embodiment, the selected data packets received from the M-eNode B at the anchor cell can be received on a bearer, wherein the bearer can be split at the M-eNode B at one of: an Open Systems Interconnect (OSI) layer located above a packet data convergence protocol (PDCP) layer of the M-eNode B; a PDCP layer of the M-eNode B; or a radio link control (RLC) layer of the M-eNode B.

In another embodiment, the UE can be further configured to receive, from the anchor cell, control information at the WWAN node in the multi-RAT UE. In another embodiment, the UE can be further configured to receive, at the WWAN node, data packets from the multi-RAT SC-eNode B selected by a MRCF module of the multi-RAT SC-eNode B and receive, at the WLAN cell, data packets from the WLAN cell of the multi-RAT node selected by the MRCF module of the multi-RAT SC-eNode B. In another embodiment, the UE can be further configured to enter an idle mode when no data packets are received from the anchor cell or the multi-RAT SC-eNode B.

Another example provides functionality 1000 of product including a non-transitory storage medium having stored thereon instructions that are adapted to be executed to implement a method for communicating information in an anchor-booster architecture of a multiple radio access technology (multi-RAT) heterogeneous network (HetNet), as shown in the flow chart in FIG. 10. The instructions of the product can be implemented as a method or as instructions on a machine, where the instructions are included on at least one computer readable medium or one non-transitory machine readable storage medium. The method can comprise receiving, at a WLAN SC-AP, data packets from a UE selected by a MRCF module for transmission by a WLAN cell, as in block 1010. The method can further comprise communicating control information from a WWAN I/F integrated in the WLAN SC-AP to an anchor cell M-eNode B, as in block 1020. The method can further comprise transmitting the data packets from the WLAN SC-AP to the WWAN, as in block 1030.

In one embodiment, the method can further comprise transmitting data packets from the WLAN SC-AP to the anchor cell macro eNode B or transmitting data packets from the WLAN SC-AP to the packet data network gateway (P-GW) in the core network via a trusted wireless access gateway (TWAG). In another embodiment, the method can further comprise transmitting the data packets from the WWAN I/F in the WLAN SC-AP to the anchor cell M-eNode B or transmitting the data packets from the WLAN cell in the WLAN SC-AP. In one embodiment, the WWAN I/F can be configured to perform a packet discarding function, a header compression function, a data forwarding function, a buffering function, or an in-sequence delivery function.

In one embodiment, the WLAN SC-AP can receive bearer traffic via an S2a interface directly from a packet data network gateway (P-GW) of a core network. In another embodiment, a WLAN media access control (W-MAC) layer in the WLAN SC-AP can be configured to receive the bearer traffic via a WWAN I/F and from: an Open Systems Interconnect (OSI) layer located above a packet data convergence protocol (PDCP) layer of the WLAN SC-AP; a PDCP layer of the WLAN SC-AP; or a radio link control (RLC) layer of the WLAN SC-AP. In another embodiment, the WLAN SC-AP can receive bearer traffic via an X2-W interface directly from the anchor cell M-eNode B. In another embodiment, a WLAN media access control (W-MAC) layer in the WLAN SC-AP can be configured to receive the bearer traffic via a WWAN I/F and from: an Open Systems Interconnect (OSI) layer located above a packet data convergence protocol (PDCP) layer of the M-eNode B; a PDCP layer of the M-eNode B; or a radio link control (RLC) layer of the M-eNode B.

Figure 11:
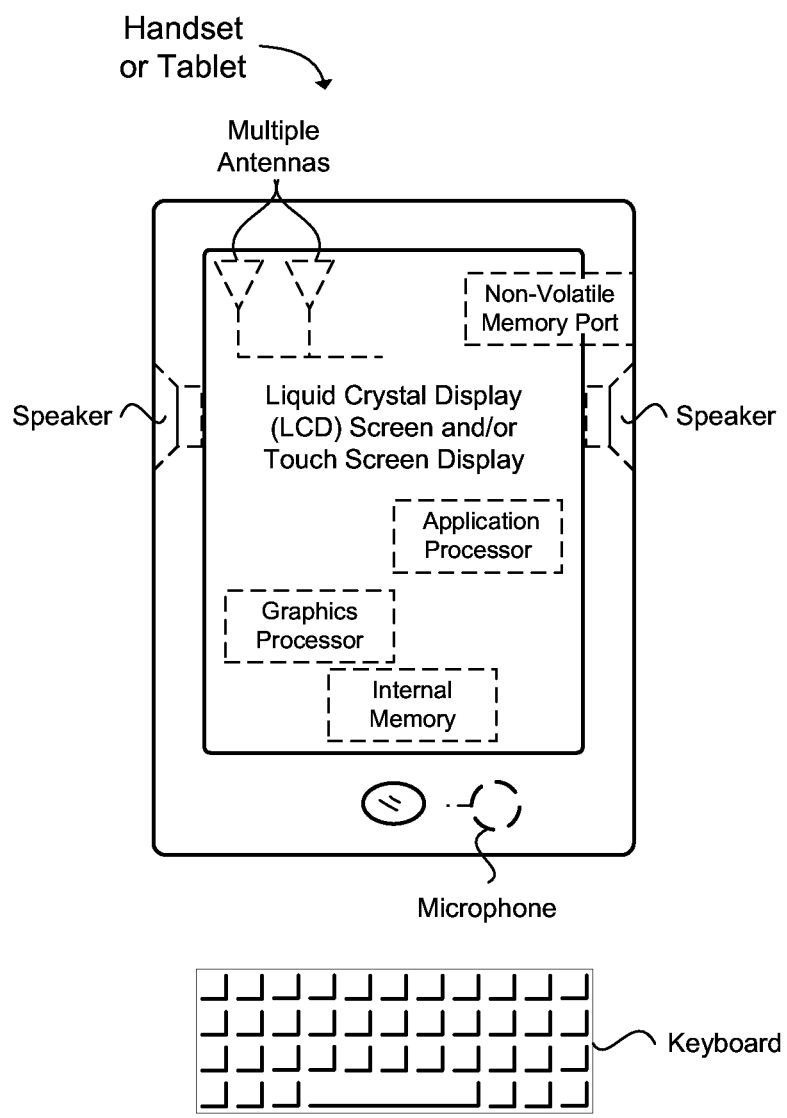
FIG. 11 illustrates a diagram of a UE in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNode B), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A multiple radio access technology (multi-RAT) node operable in an anchor-booster architecture of a multiple radio access technology (multi-RAT) heterogeneous network (HetNet), the multi-RAT node having computer circuitry configured to:
 receive, at a small cell evolved node B (SC-eNode B) of the multi-RAT node, a plurality of control packets from a macro eNode B (M-eNode B);
 receive, at the SC-eNode B of the multi-RAT node, a plurality of data packets from the M-eNode B or a serving gateway (S-GW) of a core network of the HetNet;
 transfer selected data packets of the plurality of data packets between the SC-eNode B and a wireless local area network (WLAN) cell of the multi-RAT node using a multi-RAT coordination function (MRCF) module;

communicate, from the SC-eNode B of the multi-RAT node, the selected data packets to a multi-RAT user equipment (UE);
communicate, from the WLAN cell of the multi-RAT node, the selected data packets to the multi-RAT UE;
transmit, from the SC-eNode B of the multi-RAT node, a plurality of control packets to the M-eNode B;
receive, at the SC-eNode B of the multi-RAT node, data packets from a wireless wide area network (WWAN) node in the multi-RAT UE selected by a MRCF module of the multi-RAT UE; and
receive, at the WLAN cell of the multi-RAT node, data packets from WLAN cell in the multi-RAT UE selected by a MRCF module of the multi-RAT UE.

2. The multi-RAT node of claim 1, wherein the multi-RAT node is configured to receive bearer traffic via an Xn interface directly from the M-eNode B.

3. The multi-RAT node of claim 2, wherein a WLAN media access control (W-MAC) layer in the multi-RAT node is configured to receive the bearer traffic from:
an Open Systems Interconnect (OSI) layer located above a packet data convergence protocol (PDCP) layer of the SC-eNode B;
a PDCP layer of the SC-eNode B;
a radio link control (RLC) layer of the SC-eNode B; or
a MAC layer of the SC-eNode B.

4. The multi-RAT node of claim 1, further configured to transmit, from the SC-eNode B of the multi-RAT node, the data packets received at the WWAN node and the WLAN cell, to the M-eNode B or the S-GW of a core network of the HetNet.

5. The multi-RAT node of claim 1, further configured to receive the plurality of control packets from the M-eNode B using an X2 interface.

6. The multi-RAT node of claim 1, further configured to transfer selected data packets of the plurality of data packets to the WLAN cell of the multi-RAT node on a layer above a packet data convergence protocol (PDCP) layer.

7. The multi-RAT node of claim 1, further configured to:
dynamically transfer the selected data packets of the plurality of data packets between the SC-eNode B and the WLAN cell of the multi-RAT node; and
transfer the selected data packets of the plurality of data packets from the SC-eNode B to the WLAN cell of the multi-RAT node using a layer that is located below a packet data convergence protocol (PDCP) layer, below a radio link control (RLC) layer, or below a medium access control (MAC) layer.

8. The multi-RAT node of claim 7, wherein the selected data packets are transferred from the SC-eNode B using a layer located below the PDCP layer, below the RLC layer, or below the MAC layer when the multi-RAT node uses data packet flow aggregation.

9. The multi-RAT node of claim 1, further configured to transfer the selected data packets of the plurality of data packets from the SC-eNode B to the WLAN cell of the multi-RAT node using a medium access control (MAC) layer tunnel through a WLAN link.

10. The multi-RAT node of claim 1, further configured to enter a dormant state when no data packets are received from the M-eNode B or the S-GW of the core network within a selected period of time.

11. The multi-RAT node of claim 1, further configured to transfer selected data packets of the plurality of data packets between the SC-eNode B and the WLAN cell using the MRCF module, wherein the WLAN cell is selected from a millimeter wave cell, a wireless gigabit (WiGig) cell, or a device to device (D2D) cell of the multi-RAT node.

12. The multi-RAT node of claim 1, wherein the SC-eNode B is further configured to control and coordinate communication of data packets using the MRCF module.

13. The multi-RAT node of claim 1, wherein the multi-RAT node is configured to receive bearer traffic via an S1 interface directly from a serving gateway (S-GW) of a core network.

14. The multi-RAT node of claim 13, wherein a WLAN media access control (W-MAC) layer in the multi-RAT node is configured to receive the bearer traffic from:
an Open Systems Interconnect (OSI) layer located above a packet data convergence protocol (PDCP) layer of the SC-eNode B;
a PDCP layer of the SC-eNode B;
a radio link control (RLC) layer of the SC-eNode B; or
a MAC layer of the SC-eNode B.

15. A user equipment (UE) operable in an anchor-booster architecture of a multiple radio access technology (multi-RAT) heterogeneous network (HetNet), the UE having computer circuitry configured to:
transmit, from a wireless wide area network (WWAN) node in the multi-RAT UE, control information to an anchor cell;
select data packets of the multi-RAT UE for transmission via one of the WWAN node and a wireless local area network (WLAN) node in the multi-RAT UE using a multi-RAT coordination function (MRCF) module;
transmit each data packet from one of the WWAN node and the WLAN cell to a multi-RAT small cell evolved node B (SC-eNode B) based on the selection by the MRCF module;
receive, from the anchor cell, control information at the WWAN node in the multi-RAT UE;
receive, at the WWAN node, data packets from the multi-RAT SC-eNode B selected by a MRCF module of the multi-RAT SC-eNode B; and
receive, at the WLAN cell, data packets from the WLAN cell of the multi-RAT node selected by the MRCF module of the multi-RAT SC-eNode B.

16. The UE of claim 15, further configured to receive selected data packets at the WWAN node from a macro eNode B (M-eNode B) at the anchor cell.

17. The UE of claim 16, wherein the selected data packets received from the M-eNode B at the anchor cell are received on a bearer, wherein the bearer is split at the M-eNode B at one of:
an Open Systems Interconnect (OSI) layer located above a packet data convergence protocol (PDCP) layer of the M-eNode B;
a PDCP layer of the M-eNode B; or
a radio link control (RLC) layer of the M-eNode B.

18. The UE of claim 15, further configured to enter an idle mode when no data packets are received from the anchor cell or the multi-RAT SC-eNode B.

19. A product including a non-transitory storage medium having stored thereon instructions that are adapted to be executed to implement a method of communicating information in an anchor-booster architecture of a multiple radio access technology (multi-RAT) heterogeneous network (HetNet), the method comprising:
receiving, at a wireless local area network (WLAN) small cell access point (SC-AP), data packets from a user equipment (UE) selected by a multi-RAT coordination function (MRCF) module for transmission by a WLAN cell;

communicating control information from a wireless wide area network (WWAN) interface (I/F) integrated in the WLAN SC-AP to an anchor cell macro evolved node B (M-eNode B);

transmitting the data packets from the WLAN SC-AP to the WWAN; and transmitting data packets from the WLAN SC-AP to the anchor cell macro eNode B;

transmitting the data packets from the WWAN I/F in the WLAN SC-AP to the anchor cell M-eNode B;

transmitting the data packets from the WLAN cell in the WLAN SC-AP.

20. The product of claim 19, wherein the WLAN SC-AP receives bearer traffic via an S2a interface directly from a packet data network gateway (P-GW) of a core network.

21. The product of claim 20, wherein a WLAN media access control (W-MAC) layer in the WLAN SC-AP is configured to receive the bearer traffic via a WWAN I/F and from:

an Open Systems Interconnect (OSI) layer located above a packet data convergence protocol (PDCP) layer of the WLAN SC-AP;

a PDCP layer of the WLAN SC-AP; or a radio link control (RLC) layer of the WLAN SC-AP.

22. The product of claim 19, wherein the WLAN SC-AP receives bearer traffic via an X2-W interface directly from the anchor cell M-eNode B.

23. The product of claim 22, wherein a WLAN media access control (W-MAC) layer in the WLAN SC-AP is configured to receive the bearer traffic via a WWAN I/F and from:

an Open Systems Interconnect (OSI) layer located above a packet data convergence protocol (PDCP) layer of the M-eNode B;

a PDCP layer of the M-eNode B; or a radio link control (RLC) layer of the M-eNode B.

24. The product of claim 19, the method further comprising: transmitting data packets from the WLAN SC-AP to the packet data network gateway (P-GW) in the core network via a trusted wireless access gateway (TWAG).

25. The product of claim 19, wherein the WWAN I/F is configured to perform a packet discarding function, a header compression function, a data forwarding function, a buffering function, or an in-sequence delivery function.

* * * * *